US009571699B2

(12) United States Patent
Utaka

(10) Patent No.: US 9,571,699 B2
(45) Date of Patent: Feb. 14, 2017

(54) INFORMATION PROCESSING SYSTEM, INFORMATION PROCESSING METHOD, AND COMPUTER PROGRAM PRODUCT

(71) Applicant: Yohichi Utaka, Kanagawa (JP)

(72) Inventor: Yohichi Utaka, Kanagawa (JP)

(73) Assignee: RICOH COMPANY, LIMITED, Tokyo (JP)

(*) Notice: Subject to any disclaimer, the term of this patent is extended or adjusted under 35 U.S.C. 154(b) by 0 days.

(21) Appl. No.: 14/793,877

(22) Filed: Jul. 8, 2015

(65) Prior Publication Data

US 2016/0014303 A1 Jan. 14, 2016

(30) Foreign Application Priority Data

Jul. 10, 2014 (JP) ................... 2014-142528
Jun. 4, 2015 (JP) ................... 2015-114235

(51) Int. Cl.
H04N 1/44 (2006.01)
G06F 1/32 (2006.01)
G06F 3/12 (2006.01)

(52) U.S. Cl.
CPC .................. H04N 1/4433 (2013.01)

(58) Field of Classification Search
CPC ............... B41J 29/393; G03G 15/5004; G03G 15/5075; G03G 15/5091; G03G 15/55; G03G 15/5016; G03G 15/70; G06F 21/31; G06F 21/81; Y02B 60/1267; H04N 1/00384; H04N 1/00411; H04N 1/00496; H04N 1/00129; H04N 1/00204; H04N 1/0023; H04N 1/00347; H04N 1/00408; H04N 1/00416; H04N 1/00419; H04N 1/00474; H04N 1/00482; H04N 1/00493; H04N 1/00538; H04N 1/00928; H04N 1/32363; H04W 4/008; H04W 5/0025; H04W 5/0031; H04W 5/0037

(Continued)

(56) References Cited

U.S. PATENT DOCUMENTS

2009/0201527 A1* 8/2009 Yamada ............ G03G 15/5016
358/1.15
2009/0237723 A1* 9/2009 Ueda ................ G03G 15/55
358/1.15

(Continued)

FOREIGN PATENT DOCUMENTS

JP 2011-243017 12/2011
JP 2013-092786 5/2013
JP 2016027954 A 2/2016

Primary Examiner — Chad Dickerson
(74) Attorney, Agent, or Firm — Harness, Dickey & Pierce, P.L.C.

(57) ABSTRACT

An information processing system includes an image forming part and an operation part attachable to and detachable from the image forming part. The information processing system includes: a first detection unit configured to detect whether a state where a function of the image forming part is usable via the operation part is established; a second detection unit configured to detect whether the operation part has been detached from the image forming part; and a restriction control unit configured to perform control to restrict a predetermined function of the operation part when, while the first detection unit has detected that the state where the function of the image forming part is usable via the operation part is not established, the second detection unit has detected that the operation part has been detached from the image forming part.

17 Claims, 10 Drawing Sheets

(58) Field of Classification Search
USPC ..... 358/1.11–1.18, 504, 406; 455/41.1, 41.2, 455/41.3; 235/382; 345/156; 307/104; 320/108; 713/182–186, 300, 310, 320, 323, 324, 713/330, 340; 726/5, 26–28, 36
See application file for complete search history.

(56) References Cited

U.S. PATENT DOCUMENTS

| | | | |
|---|---|---|---|
| 2010/0127076 A1* | 5/2010 | Hashimoto | B41J 29/393 235/382 |
| 2011/0122440 A1* | 5/2011 | Akazawa | H04N 1/00129 358/1.15 |
| 2015/0038076 A1* | 2/2015 | Naruse | H04W 4/008 455/41.1 |
| 2016/0014303 A1 | 1/2016 | Utaka | |

* cited by examiner

INFORMATION PROCESSING SYSTEM, INFORMATION PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2014-142528 filed in Japan on Jul. 10, 2014 and Japanese Patent Application No. 2015-114235 filed in Japan on Jun. 4, 2015.

BACKGROUND OF THE INVENTION

1. Field of the Invention

The present invention relates to an information processing system, an information processing method, and a computer program product.

2. Description of the Related Art

Conventionally, operations (user interfaces) of printers and multifunction peripherals (MFPs) have been generally performed by use of operation part units each formed of a liquid crystal display (LCD) and a keyboard. Via such an operation part unit, a user can, for example, input the number of copies, give an instruction to execute copying by pressing a start button, and input an Internet Protocol (IP) address for connecting a machine to a network. In recent years, a highly functional operation part unit equipped with an Android (registered trademark) operating system (OS) has been developed, which also functions as a tablet apparatus, a smartphone, or the like. For example, with a printer or an MFP being equipped with a near field communication (NFC) device, an operation part unit can be used for user administration such as logout/login on the printer or the MFP and user-by-user restriction of usable functions.

For example, Japanese Patent Application Publication No. 2013-92786 discloses a technique for higher power-saving performance, which is configured not to allow the state of power to turn back to a normal state from a power-saving state when authentication by a near field communication (NFC) device has failed.

For example, in the case of a highly functionalized operation part unit, although authentication is necessary for using functions of an image forming apparatus via an operation part, such a highly functional operation part unit may have its specific functions usable without authentication, and has a risk of being stolen with an intention to use such authentication-free functions.

SUMMARY OF THE INVENTION

It is an object of the present invention to at least partially solve the problems in the conventional technology.

An information processing system includes an image forming part and an operation part attachable to and detachable from the image forming part. The information processing system includes: a first detection unit configured to detect whether a state where a function of the image forming part is usable via the operation part is established; a second detection unit configured to detect whether the operation part has been detached from the image forming part; and a restriction control unit configured to perform control to restrict a predetermined function of the operation part when, while the first detection unit has detected that the state where the function of the image forming part is usable via the operation part is not established, the second detection unit has detected that the operation part has been detached from the image forming part.

An information processing method includes: first detecting whether a state where a function of an image forming part is usable via an operation part attachable to and detachable from the image forming part is established; second detecting whether the operation part has been detached from the image forming part; and performing control to restrict a predetermined function of the operation part when it has been detected at the first detecting that the state where the function of the image forming part is usable via the operation part is not established, and it has been detected at the second detecting that the operation part has been detached from the image forming part.

A computer program product includes a non-transitory computer-readable medium containing an information processing program. The program causes a computer to perform: first detecting whether a state where a function of an image forming part is usable via an operation part attachable to and detachable from the image forming part is established; second detecting whether the operation part has been detached from the image forming part; and performing control to restrict a predetermined function of the operation part when it has been detected at the first detecting that the state where the function of the image forming part is usable via the operation part is not established, and it has been detected at the second detecting that the operation part has been detached from the image forming part.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes embodiments of an information processing system, an information processing method, and a computer program product according to the present invention in detail with reference to the accompanying drawings. The following description uses, as a non-limiting example of the information processing system, a digital color multifunctional machine called an MFP in which a copy function, a facsimile function, a printing function, a scanner function, and a function designed to distribute an input image (an original document image read by the scanner function, or an image input by a printer or the facsimile function) are integrated.

First Embodiment

Figure 1:
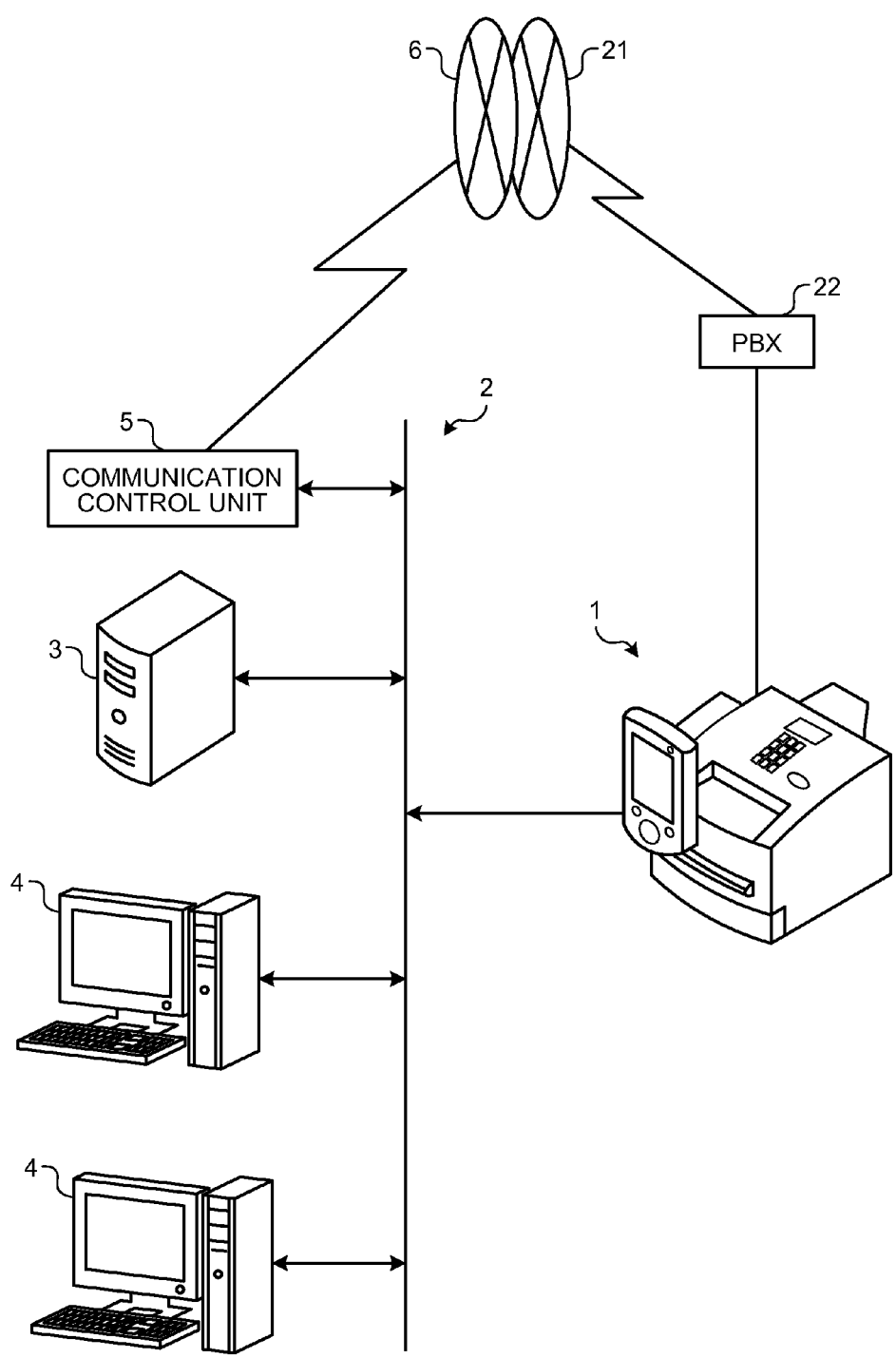
FIG. 1 is a diagram illustrating an exemplary configuration of a system including an MFP of an embodiment.

FIG. 1 is a diagram illustrating an exemplary configuration of a system including an MFP 1 of this embodiment. As illustrated in FIG. 1, this embodiment assumes a system in which a server computer 3 provided as an information processing apparatus that executes various kinds of information processing, and a plurality of client computers 4 are connected to the MFP 1 via a local area network (LAN) 2 provided as a communication network.

The server computer 3 is, for example, an apparatus that implements functions for supporting File Transfer Protocol (FTP) and Hyper Text Transfer Protocol (HTTP), and the functions of at least one of a Web server and a domain name server (DNS). More specifically, this system has an environment constructed therein that enables sharing of image processing functions of the MFP 1 over the LAN 2. Examples of the image processing functions include an image input function (the scanner function), an image output function (the printing function), and an image storing function. The system is connected to an internet network 6 via a communication control unit 5, thereby being able to perform data communications with an external environment via the internet network 6. As the communication control unit 5, such devices as a router, a switchboard, a modem, and a digital subscriber line (DSL) modem are generally used, but a device at least capable of Transmission Control Protocol/Internet Protocol (TCP/IP) communication is acceptable. The LAN 2 is not limited to wire communication, but may communicate wirelessly (for example, by infrared rays or radio waves). The LAN 2 may be an optical fiber network. In the example in FIG. 1, the MFP 1 is connected to a private branch exchange (PBX 22) that is further connected to a public telephone network 21.

Figure 2:
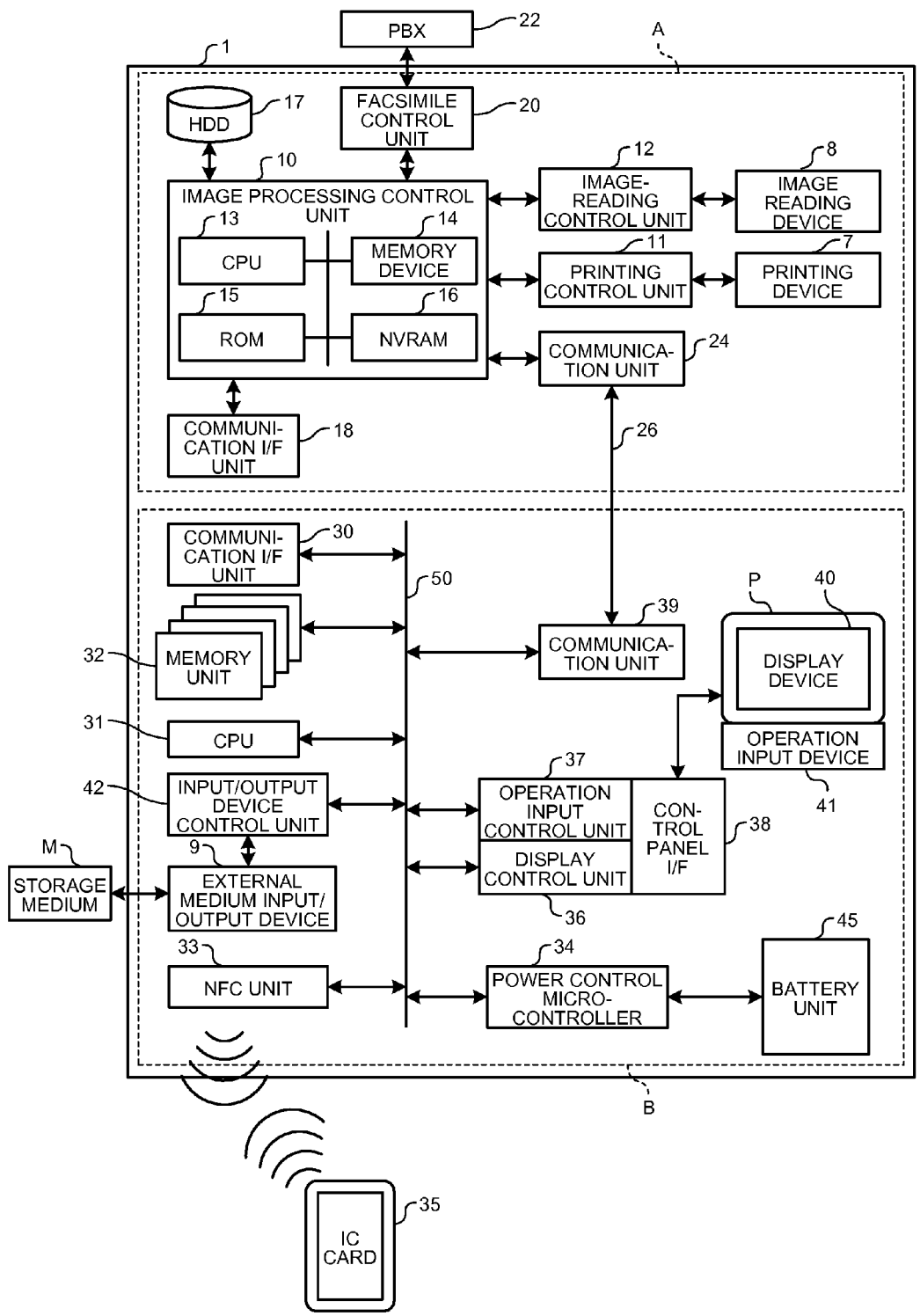
FIG. 2 is a diagram illustrating an exemplary internal configuration of the MFP.

FIG. 2 is a diagram illustrating an exemplary internal configuration of the MFP 1. The MFP 1 includes an image processing unit A and an operation part unit B attachable to and detachable from the image processing unit A as illustrated in FIG. 2. Being an apparatus that functions at least to form an image on a recording medium, the image processing unit A in this example corresponds to an "image forming part" in the appended claims. Additionally, the operation part unit B is a terminal to which a user (authenticated user), who is recognized as having the right to use (operate) the operation part unit B to use functions of the image processing unit A, inputs operations to use functions of the image processing unit A. The operation part unit B in this example corresponds to an "operation part" in the appended claims.

The image processing unit A further includes an image processing control unit 10 that controls overall image processing in the image processing unit A. A printing control unit 11 that controls a printing device 7 and an image-reading control unit 12 that controls an image reading device 8 are connected to this image processing control unit 10.

In accordance with control from the image processing control unit 10, the printing control unit 11 outputs a printing instruction containing image data to the printing device 7. Upon receiving this printing instruction, the printing device 7 outputs an image by forming the image on a recording medium such as transfer paper. The printing device 7 in this example is capable of full-color printing. Examples of a printing method applicable to the printing device 7 are various, including not only electrophotography but also ink-jet printing, sublimation dye thermal transfer, silver halide photography, direct thermal printing, and thermal wax transfer.

In accordance with control from the image processing control unit 10, the image-reading control unit 12 drives the image reading device 8 to read an original document in such a manner that: light emitted from a lamp and reflected by a surface of the original document is converged by a mirror and a lens on a light receiving element (for example, a charge coupled device (CCD); and the output from the light receiving element is subjected to analog-digital (A/D) conversion, whereby digital image data of 8 bits for each of RGB colors is obtained.

The image processing control unit 10 as described above is constructed as a microcomputer in which a central processing unit (CPU) 13, a memory device (such as, for example, a synchronous dynamic random access memory (SDRAM)) 14, a read only memory (ROM) 15, and a non-volatile random access memory (NVRAM) 16 are connected together via a bus. The CPU 13 serves as a main processor. The memory device 14 is used for temporarily storing image data read from the image reading device 8 so that the printing device 7 can later use the data for image formation. The ROM 15 stores therein a control program and the like. The NVRAM 16 can hold therein data when the power supply is off, and is used for recording system logs, system settings, log information, and the like.

A hard disk drive (HDD) 17, a communication interface (I/F) unit 18, and a facsimile control unit 20 are connected to the image processing control unit 10. The HDD 17 serves as a storage device for large amounts of accumulated image data and job history. The communication I/F unit 18 is used for connecting the image processing unit part A to the LAN 2 by wire or wirelessly. The facsimile control unit 20 performs facsimile control. This facsimile control unit 20 is connected to a private branch exchange (PBX) 22 connected to the public telephone network 21, and the MFP 1 can thus communicate with a remote facsimile machine. Furthermore, a communication unit 24 for use in communication (connection) with the operation part unit B is connected to the image processing control unit 10. While this example configures the communication unit 24 to communicate with (connect to) the operation part unit B via a communication cable 26, it is a non-limiting example. For example, the communication unit 24 may be configured to wirelessly communicate with the operation part unit B.

The image processing unit A analyzes printing data, which is image information from the outside (such as the server computer 3, the client computer 4, or a facsimile machine) and a printing instruction command, converts the printing data into bitmap data so as to make the printing data printable as output image data, and determines, by analyzing a printing mode from the command, how it should operate. Note that the above printing data and command are received via the communication I/F unit 18 or the facsimile control unit 20.

The image processing unit A can transfer the following data to the outside (such as the server computer 3, the client computer 4, or a facsimile machine): printing data stored in the memory device 14 and the HDD 17; data read from an original document; output image data obtained by processing any of the above data so that the data can be output; and compressed data obtained by compressing any of the above data.

Furthermore, the image processing unit A transfers image data read by the image reading device 8 to the image processing control unit 10, corrects signal degradation caused by an optical system and quantization into digital signals, and writes the image data into a memory device 14. The image data thus stored in the memory device 14 is converted into output image data by the printing control unit 11 to be output to the printing device 7.

Next described is the operation part unit B. The operation part unit B includes a CPU 31 functioning as a main processor. A memory unit 32 is connected to the CPU 31 via the bus 50. The memory unit 32 includes: a random access memory (RAM) to be used by the CPU 31 as a work area; and a Flash ROM storing a boot program.

A display control unit 36 that controls an operation panel P and an operational-input control unit 37 are connected to the CPU 31. However, this example does not limit the embodiment. For example, the display control unit 36 and the operational-input control unit 37 may be included among the functions of the CPU 31.

Figure 3:
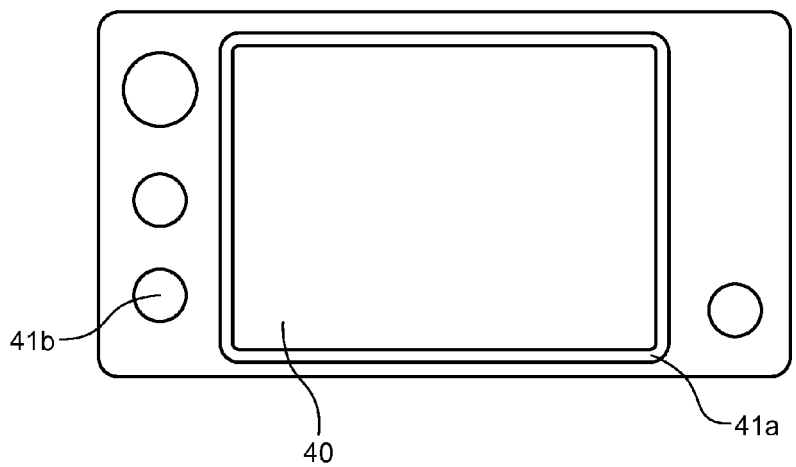
FIG. 3 is a plan view illustrating an exemplary configuration of an operation panel.

Here, FIG. 3 is a plan view illustrating an exemplary configuration of the operation panel P. As illustrated in FIG. 3, the operation panel P includes a display device 40, which is, for example, an LCD. The operation panel P further includes a touch panel 41a laminated on a surface of the display device 40, and a keyboard 41b including a plurality of keys. In this example, the touch panel 41a and the keyboard 41b constitute an operational-input device 41 illustrated in FIG. 2. Note that the keyboard 41b includes a start key for declaring the start of image reading, a numeric keypad for inputting numeric values, a reading-condition setting key for setting a transmission destination of read image data, and a clear key. Some or all of these keys may be displayed on the display device 40 as a soft keyboard using the touch panel.

Referring back to FIG. 2, the embodiment is further described. The display control unit 36 outputs an image display control signal to the display device 40 via the control panel I/F 38, and causes the display device 40 to display information corresponding to the image display control signal. The operational-input control unit 37 receives, via the control panel I/F 38, an input control signal corresponding to setting of a function or inputting of an operation from the operator at the operational-input device 41.

Possible forms for connection between the operation part unit B and the outside are, for example, universal serial bus (USB), Ethernet (registered trademark), IEEE 1394, small computer system interface (SCSI), wireless LAN, Bluetooth (registered trademark), Ultra Wide Band (UWB), ZigBee (registered trademark), and specifically designed serial communication or parallel communication. While a USB and a wire LAN are preferred in terms of balance between cost and connection easiness, wireless connection is preferred for the purpose of implementing connections of various types, such as many-to-one connections, one-to-many connections, and many-to-many connections.

In the example of FIG. 2, a communication I/F unit 30 for connecting the image processing unit A to the LAN 2 by wire or wirelessly is connected to the CPU 31 via the bus 50. In addition, a communication unit 39 for communication with the image processing unit A is connected to the CPU 31 via the bus 50. While this example configures the communication unit 39 to communicate with (connect to) the image processing unit A via the communication cable 26, it is a non-limiting example. For example, the communication unit 39 may be configured to wirelessly communicate with the image processing unit A. The communication unit 39 receives an image display control signal output from the image processing unit A, and transfers, to the image processing unit A, an input control signal from the operation panel P corresponding to setting of a function or inputting of an operation from the operator. Note here the following: the image display control signal received by the communication unit 39 from the image processing unit A is subjected to data conversion into a form usable by the display device 40 of the operation panel P before being output to the display control unit 36; and the input control signal from the operation panel P corresponding to setting of a function or inputting of an operation from the operator is subjected to data conversion into a form conformant to specifications acceptable in the image processing unit A before being input to the communication unit 39.

As described above, an operating system (OS) to be executed by the CPU 31 and application programs are stored in the memory unit 32. This indicates that the memory unit 32 has one part functioning as a storage medium to store therein application programs, and the other part functioning as a RAM used for loading therein and actually running thereon these applications.

Such an OS and applications function to, for example, start up a computer program, load information, and store information in response to user operations. Well-known representative examples of an OS include Windows (registered trademark) and Linux (registered trademark). Computer programs that run on these OS's are called application programs.

Note that the MFF 1 of this embodiment is equipped with an external medium input/output device 9 such as a medium drive device. The external medium input/output device 9 is a device that reads a computer program code (control programs) and image data stored in a storage medium M, and writes a computer program code and image data into the storage medium M. The storage medium M stores therein various computer program codes, such as an OS, a device driver, and various application programs, and image data. The storage medium M is a semiconductor memory, representative examples of which include a USB memory and an SD card. The external medium input/output device 9 as described above is controlled by the input/output device control unit 42, which is connected to the CPU 31 via the bus 50.

An application program stored in the memory unit 32 may be a program obtained by installing an application program recorded in this storage medium M. For this reason, the storage medium M can be a storage medium that stores an application program. Furthermore, an application program may be downloaded from the outside via, for example, the internet network 6 and the LAN 2 to be installed into the memory unit 32.

Note that the input/output device control unit 42 is configured to be capable of connecting to various pieces of equipment by supporting various interfaces including those based on USB, IEEE 1394, SCSI, Bluetooth (registered trademark), UWB, and infrared rays. These interfaces are provided as optional devices.

An NFC unit 33 and a power control microcontroller 34 are further connected to the CPU 31 via the bus 50. The NFC unit 33 wirelessly communicates with an integrated circuit (IC) card 35 when the IC card 35 is held over (is close to) the operation part unit B. The IC card 35 illustrated in FIG. 2 is a card device capable of identifying users and storing identification (ID) data (exemplary identification information) for user authentication. Examples thereof include Felica (registered trademark) and an employee ID card. The IC card 35 wirelessly communicates with an NFC-capable mobile apparatus represented by a smartphone, a tablet PC, and a mobile phone.

The NFC unit 33 is constructed of members including an NFC controller, an antenna, a memory device, and a memory access controller. The memory device is connected to the bus 50 of the operation part unit B and configured to be readable by the CPU 31. When a power-saving state and during a power-off state is established, access from the NFC unit 33 to the memory unit 32 is enabled by causing the power control microcontroller 34 to switch the bus 50.

The power control microcontroller 34 controls a power supply of the operation part unit B, more specifically, monitors power supplies of the respective units and controllers and controls on and off of the power supplies. During a power-saving state, this power control microcontroller 34 switches sources of electricity supply to the NFC unit 33, to a battery unit 45. NFC is the most suitable for acquiring data without returning the MFP 1 from the power-saving state as far as possible.

The battery unit 45 functions to supply power to the operation part unit B for enabling the operation part unit B to operate in a standalone state after being detached from the image processing unit A. Charging and discharging of the battery unit 45 is controlled by the power control microcontroller 34. In the power-saving state and a power-off state, power from the battery unit 45 is used for transmitting information stored in the memory device through communication by NFC when the information is requested during communication with the IC card 35. The battery unit 45 can be charged with a secondary battery such as a nickel hydride and a lithium-ion battery to be repeatedly used. The capacity of the battery unit 45 is determined depending on an operating time and a current of the equipment.

Figure 4:
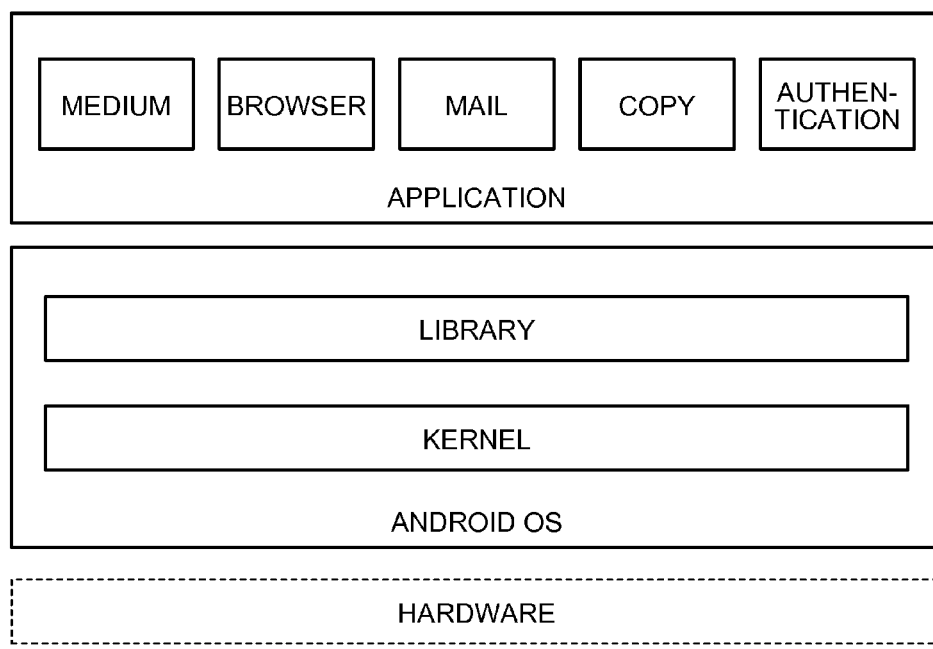
FIG. 4 is a diagram illustrating an exemplary software configuration of an operation part unit.

An Android OS may be installed in the operation part unit B. FIG. 4 is a diagram illustrating an exemplary software configuration of the operation part unit B. The Android OS serves as an I/F between hardware and application software. As illustrated in FIG. 4, the Android OS is composed of a kernel and various libraries. The kernel manages, for example, processes, memories, and devices. The various libraries provide applications with execution environments such as display-related (such as fonts) functions, support of various kinds of media, security, and communication. On this basis, specialized applications operate together with OS basic applications such as a browser and an email client. The specialized applications include: a copy application that invokes and runs the copy function of the MFP 1 from an operation screen; and an authentication application that executes NFC-based authentication. This example has hardware and software structures allowing the operation part unit B to be used as a tablet PC after it is detached from a main body (the image processing unit A).

Figure 5:
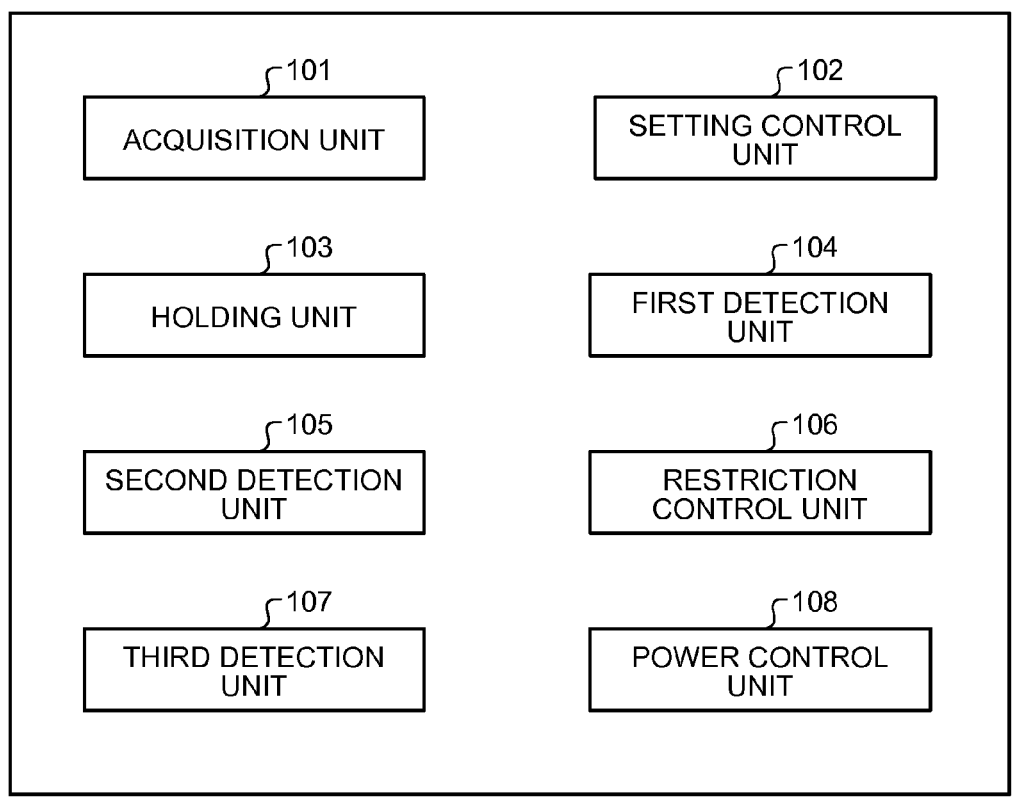
FIG. 5 is a diagram illustrating an exemplary functional configuration of the MFP.

FIG. 5 is a diagram illustrating an exemplary functional configuration of the MFP 1 of this embodiment. For convenience of description, FIG. 5 mainly illustrates functions according to the present invention, but functions provided to the MFP 1 are not limited to the illustrated ones. As illustrated in FIG. 5, the MFP 1 includes an acquisition unit 101, a setting control unit 102, a holding unit 103, a first detection unit 104, a second detection unit 105, a restriction control unit 106, a third detection unit 107, and a power control unit 108. These functions illustrated in FIG. 2 are implemented with computer programs executed by the CPU 13 or 31. These functions can be distributed between the operation part unit B and image processing unit A when being built in the MFP 1. A form of the distribution is arbitrarily changeable. For example, all of the above functions may be built in the operation part unit B.

The acquisition unit 101 acquires identification information for identifying users who use the operation part unit B. In this example, the acquisition unit 101 has the function of, when a user passes an IC card 35 owned by the user over the operation part unit B, acquiring ID in the IC card 35.

When the ID acquired by acquisition unit 101 coincides with and registration information registered in advance, i.e., a user identified with the ID has been authenticated as a user having the right to use a function of the image processing unit A via the operation part unit B, the setting control unit 102 performs control to perform setting to the state where the function of the image processing unit A is usable via the operation part unit B. Here, authentication means to admit that a user has a right to use a function of the image processing unit A via the operation part unit B. By contrast, when a user has not been authenticated, the setting control unit 102 performs control to perform setting to the state where no function of the image processing unit A is usable via the operation part unit B. Thus, while the state where the function of the image processing unit A is usable via the operation part unit B is established when the user has been authenticated, the state where no function of the image processing unit A is usable via the operation part unit B is established when the user has not been authenticated.

Reasons why authentication is performed for the use of the MFP 1 (the image processing unit A) include: expenses for paper for copy and printing; communication expenses incurred when facsimile is used; and protection of image data security associated with copy, printing and facsimile. This example employs a mechanism where: the ID in the IC card is read out and compared with registration data (registration information) on an authentication server (not illustrated) via a LAN or the like when a user has held the IC card 35 over the operation part unit B (functioning as an authentication device); and the user is enabled to use a function permitted by each user administrator if the ID and the registration data coincide with each other. In general, information on ID is not allowed to be stored in storage of a client from the perspective of security. The operation part unit B encrypts, among pieces of ID having been read out by the NFC unit 33 (a function corresponding to the acquisition unit 101), pieces of ID that have been authenticated by the authentication server (pieces of ID that coincide with the registration information) and stores these pieces of ID on a non-volatile memory (corresponding to the holding unit 103 described below) of the memory unit 32 as user ID information indicating already-authenticated pieces of ID. This user ID information is not used during operation as the MFP 1, and is used only in an environment where the operation part unit B has been detached from the main body. Details thereof are described later.

The holding unit 103 holds the above-described user ID information indicating already-authenticated pieces of ID. The first detection unit 104 detects whether the state where the function of the image processing unit A is usable via the operation part unit B is established. For example, when the acquisition unit 101 has acquired no ID, the first detection unit 104 detects that the state where no function of the image processing unit A is usable via the operation part unit B is established.

The second detection unit 105 detects whether the operation part unit B has been detached from the image processing unit A. When the second detection unit 105 has detected that the operation part unit B has been detached from the image processing unit A while the first detection unit 104 has detected that the state where no function of the image processing unit A is usable via the operation part unit B is established, the restriction control unit 106 performs control to restrict a predetermined function of the operation part unit B. In this example, as the control to restrict a predetermined function of the operation part unit B, the restriction control unit 106 performs control to cause the operation part unit B to transition into a second state where power consumption thereof is lower than in a first state where provision of the predetermined function is possible. In other words, the restriction control unit 106 controls power to be supplied to the operation part unit B so that the operation part unit B may transition into the second state.

When, with the operation part unit B having been detached from the image processing unit A, the operation part unit B is in the second state where power consumption thereof is lower than in the first state, if the acquisition unit 101 has acquired a piece of ID, the third detection unit 107 detects whether the acquired piece of ID coincides with any authenticated piece of ID.

The power control unit 108 controls the state of power to the MFP 1. For example, when the third detection unit 107 has detected coincidence between the piece of ID acquired by the acquisition unit 101 and any authenticated piece of ID, the power control unit 108 performs control to cause the operation part unit B to transition into the first state.

Figure 6:
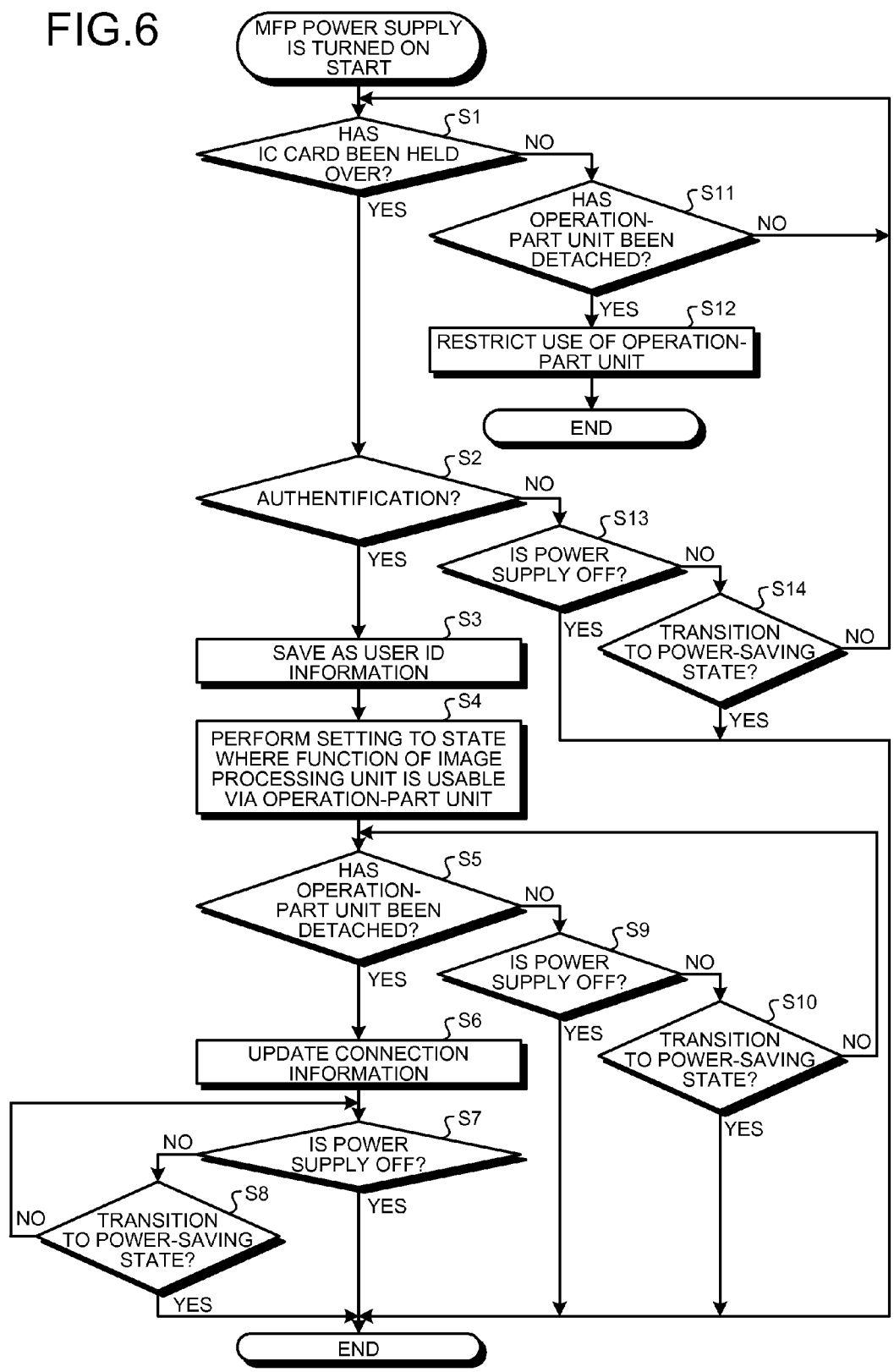
FIG. 6 is a flowchart illustrating exemplary operation of the MFP.

Next described with reference to FIG. 6 to FIG. 9 is exemplary operation of the MFP 1 of this embodiment. FIG. 6 is a flowchart illustrating exemplary operation when a power supply of the MFP 1 is on (in a normal state where provision of a function of the MFP 1 is possible). Firstly, when an IC card has been held (Yes at step S1), that is, when the acquisition unit 101 has acquired a piece of ID, the setting control unit 102 transmits the piece of ID acquired by the acquisition unit 101 to the authentication server to subject the piece of ID to an authentication process. The authentication server performs the authentication process for determining whether the piece of ID transmitted from the MFP 1 and the registration information coincide with each other, and transmits, back to the MFP 1, information indicating the result of the authentication. If the piece of ID has been authenticated (Yes at step S2), the setting control unit 102 encrypts this piece of ID and causes the holding unit 103 to hold it as the user ID information indicating an authenticated piece of ID (step S3). Then, the setting control unit 102 performs setting to the state where the function of the image processing unit A is usable via the operation part unit B (step S4).

After step S4, if the operation part unit B has been detached from the image processing unit A (Yes at step S5), connection information indicating the state of a physical connection between the operation part unit B and the image processing unit A is updated to connection information indicating a state where the operation part unit B and the image processing unit A are not physically connected with each other, and the connection information is stored (step S6). During this state, the user can use not only the function of the image processing unit A but also a predetermined function of the operation part unit B (a function specific to the operation part unit B) by operating the operation part unit B detached from the image processing unit A. Thereafter, if electricity supply to the MFP 1 has completely stopped by an operation to cutting off electricity supply to the MFP 1 from a commercial power source (Yes at step S7), the MFP 1 stops operating. If electricity supply to the MFP 1 continues (No at step S7) and a condition for transition into a power-saving state of the MFP 1 (for example, elapse of a time set by a timer) is met (Yes at step S8), the MFP 1 transitions to the power-saving state and stops operating. If the condition for transition into the power-saving state is not met (No at step S8), the user can continue to use the MFP 1.

When the operation part unit B has not been detached from the image processing unit A (No at step S5), the same processes (step S9 and step S10) apply. Note that, also in this case, the user not only can use a function of the image processing unit A by operating the operation part unit B attached to the image processing unit A, but also can use a predetermined function of the operation part unit B (a function specific to the operation part unit B).

The power-saving state of the MFP 1 may be any state where power consumption thereof is lower than in its normal state. As a minimum state, the power-saving state may be any state of power where the MFP 1 can detect a signal triggering it to return to the normal state. This example sets, as the power-saving state, a state where power is supplied only to the facsimile control unit 20, the communication I/F unit 18, the communication I/F unit 30, the NFC unit 33 and the power control microcontroller 34 illustrated in FIG. 2. However, it is not a limiting example.

If the operation part unit B has been detached (Yes at step S11) without an IC card held over (No at step S1), which means that the state where the function of the image processing unit A of the MFP 1 is usable via the operation part unit B is not established and the operation part unit B has been detached from the image processing unit A, the restriction control unit 106 performs control to restrict a predetermined function of the operation part unit B (step S12).

In step S2 described above, when the piece of ID has been authenticated (No at step S2), the setting control unit 102 causes a memory (not illustrated) to hold this piece of ID as unauthenticated ID indicating a piece of ID for which authentication has failed. Thereafter, if electricity supply to the MFP 1 has been stopped following the operation to stop supplying electricity from a commercial power source to the MFP 1 (Yes at step S13), the MFP 1 stops operating. If the electricity supply to the MFP 1 continues (No at step S13) and the condition for transition to the power-saving state is met (Yes at step S14), the MFP 1 transitions to the power-saving state and stops operating. When the condition for transition to the power-saving state is not met (No at step S14), processes from step S1 onward are repeated.

Figure 7:
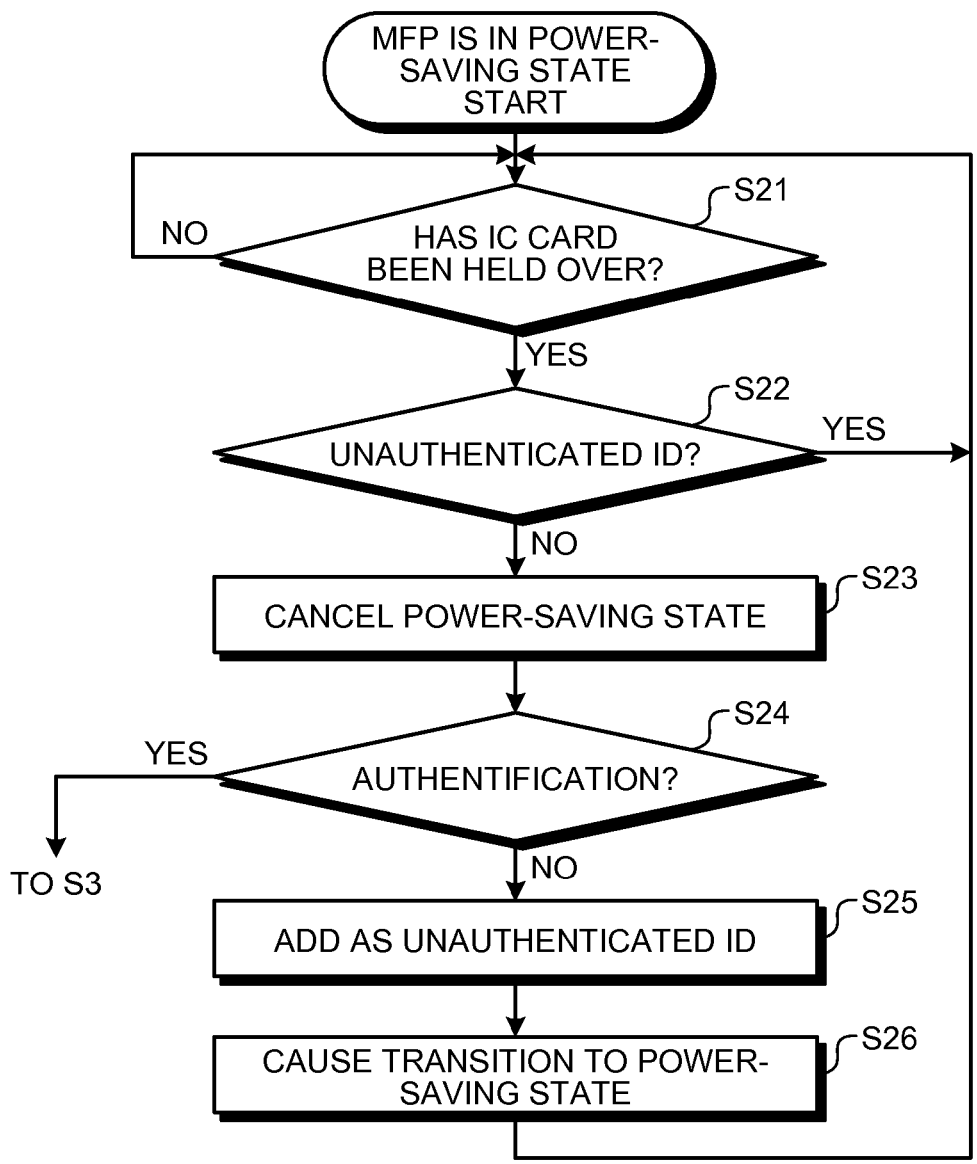
FIG. 7 is a flowchart illustrating exemplary operation of the MFP.

FIG. 7 is a flowchart illustrating exemplary operation of the MFP 1 when the MFP 1 is in the power-saving state under the environment where the operation part unit B is attached to the image processing unit A. Firstly, when an IC card is held over (Yes at step S21), which means, when the acquisition unit 101 acquires a piece of ID, the setting control unit 102 determines whether this piece of ID is an unauthenticated piece of ID (step S22). If this piece of ID is an unauthenticated piece of ID (Yes at step S22), the process returns to step S21. If this piece of ID is not an unauthenticated piece of ID (No at step S22), the setting control unit 102 instructs the power control unit 108 to cancel the power-saving state. Upon receiving this instruction, the power control unit 108 performs control to cancel the power-saving state (step S23). Subsequently, the setting control unit 102 transmits this piece of ID to the authentication server for execution of the authentication process thereon, and, if this piece of ID has been authenticated (Yes at step S24), the process proceeds to the process at step S3 in FIG. 6. If this piece of ID has not been authenticated (No at step S24), this piece of ID is added as an unauthenticated piece of ID (step S25), the power control unit 108 is instructed to transition to the power-saving state. Upon receiving this instruction, the power control unit 108 performs control to cause the MFP 1 to transition to the power-saving state again (step S26), and the processes from step S21 onward are repeated.

Figure 8:
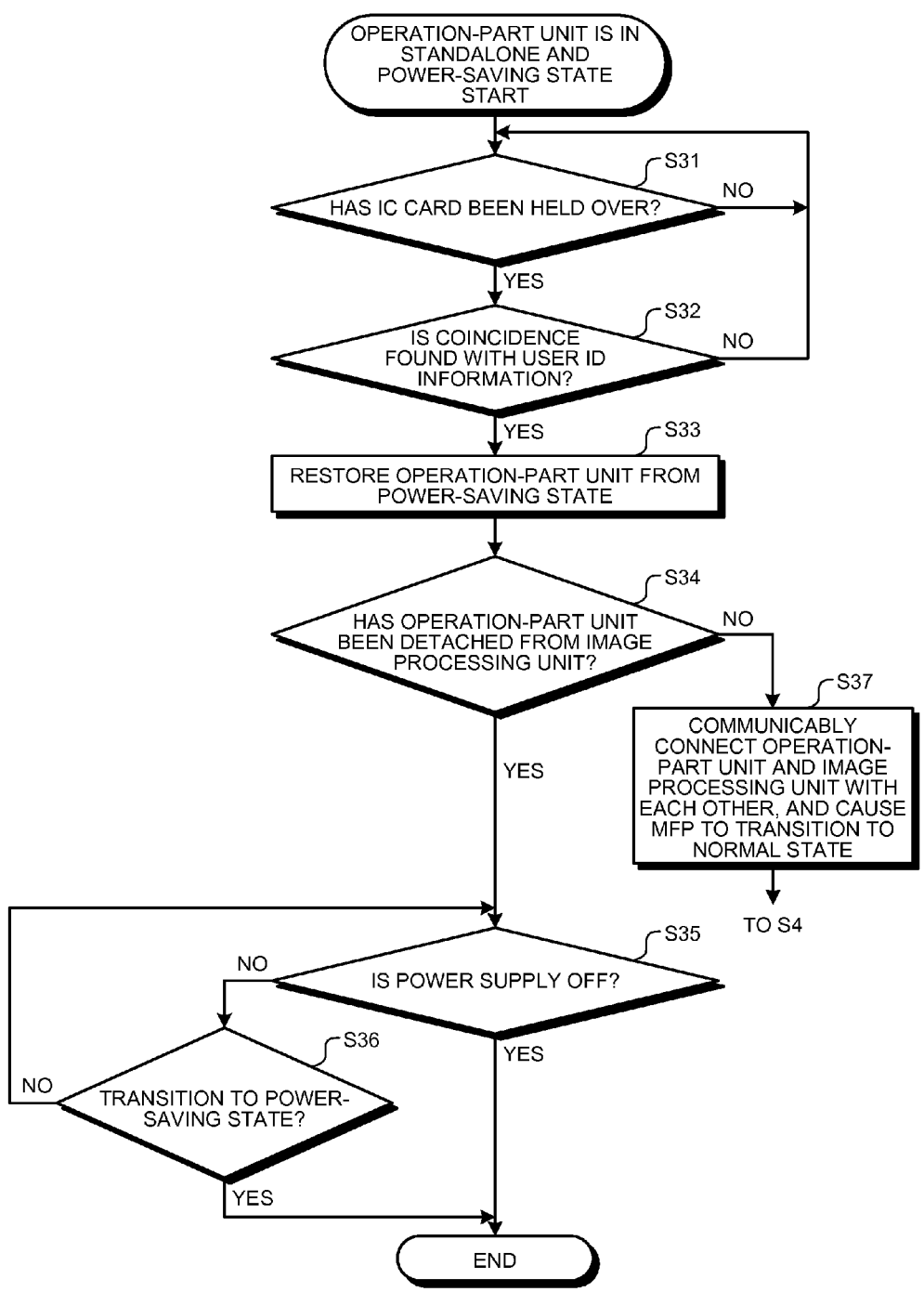
FIG. 8 is a flowchart illustrating exemplary operation of the operation part unit in a stand-alone state.

FIG. 8 is a flowchart illustrating exemplary operation of the operation part unit B in a power-saving state in the environment where it has been detached from the image processing unit A. In this example, the power-saving state of the operation part unit B means a state where power consumption of the operation part unit B is lower than in a first state and is larger power than that in an off state. The first state is a state where the operation part unit B is enabled to provide a predetermined function. The off state indicates a minimum power state where power is supplied only to the NFC unit 33 and the power control microcontroller 34, which are illustrated in FIG. 2. Here, a "second state" in the claims can be considered to include both of the power-saving state and the off state of the operation part unit B.

Firstly, when an IC card is held over (Yes at step S31), i.e., the acquisition unit 101 acquires ID, the third detection unit 107 determines whether the acquired ID coincides with ID (already-authenticated ID) indicated by user ID information in the holding unit 103 (step S32). If the acquired ID does not coincide with ID indicated by the user ID information (No at step S32), processes from step S31 onward are repeated. If the acquired ID coincides with ID indicated by the user ID information (Yes at step S32), the third detection unit 107 instructs the power control unit 108 to turn the operation part unit B back to the first state from the power-saving state. Upon receiving this instruction, the power control unit 108 performs control to turn the operation part unit B back from the power-saving state (step S33).

Thereafter, if the amount of power stored in the battery unit 45 for driving the operation part unit B in a standalone state is equal to or smaller than a threshold (the power supply is off) (Yes at step S35) while the operation part unit B has been detached from the image processing unit A (Yes at step S34), the operation ends. If a condition for causing the operation part unit B to transition to the power-saving state is met (Yes at step S36) while the amount of power stored in the battery unit 45 is larger than the threshold (No at step S35), the operation part unit B transitions to the power-saving state, and the operation ends. If the condition for causing the operation part unit B to transition to the power-saving state is not met (No at step S36), a user can continue to use the operation part unit B in a standalone state. In this case, the user can use a predetermined function of the operation part unit B (a function specific to the operation part unit B) to operate the operation part unit B.

After step S33 mentioned above, if operation part unit B is found attached to image processing unit A (No at step S34), the setting control unit 102 performs control to communicably connect the operation part unit B and the image processing unit A with each other, and the power control unit 108 performs control to cause the MFP 1 to transition to a normal state (step S37). Subsequently, the operation proceeds to the process at step S4 in FIG. 6.

Figure 9:
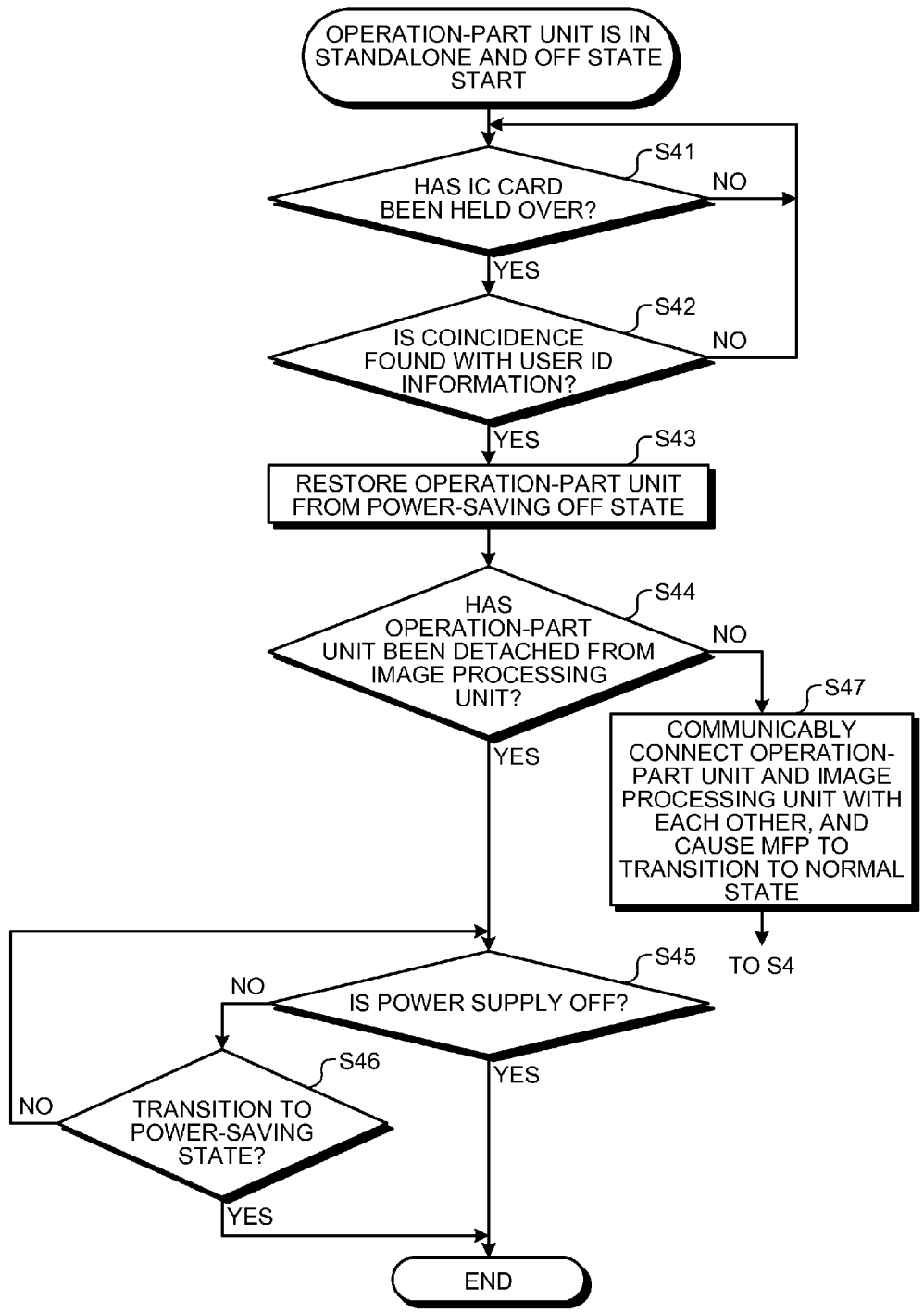
FIG. 9 is a flowchart illustrating exemplary operation of the operation part unit in a stand-alone state.

FIG. 9 is another flowchart illustrating exemplary operation of the operation part unit B in the off state in the environment where it has been detached from the image processing unit A. Specific processes at step S41 and step S42 in FIG. 9 are the same as those at step S31 and step S32 in FIG. 8, and description of details thereof is omitted. If the result of step S42 is affirmative (Yes at step S42), the third detection unit 107 instructs the power control unit 108 to turn the operation part unit B back to the first state from the off state. Upon receiving this instruction, the power control unit 108 performs control to turn the operation part unit B back from the off state (step S43). Specific processes at step S44 to step S47 that follow step S43 are the same as those at step S34 to step S37 illustrated in FIG. 8, and description thereof is omitted.

As described above, in this embodiment, control is performed to restrict a predetermined function of the operation part unit B when the following conditions hold at the same time: it has been detected that the state where the function of the image processing unit A is usable via the operation part unit B is not established; and it has been detected that the operation part unit B has been detached from the image processing unit A. Thus, even when the operation part unit B has been detached from the image processing unit A and taken away by a third person not having a legitimate right to use a predetermined function of the operation part unit B, the third parson cannot use the function. This embodiment can give the beneficial effect of enabling holding the operation part unit B from being stolen by a third person who does not have the legitimate right.

Second Embodiment

Next, a second embodiment is described. The following describes mainly the differences thereof from the first embodiment described above while appropriately omitting descriptions of parts common to the first and the second embodiments.

Figure 10:
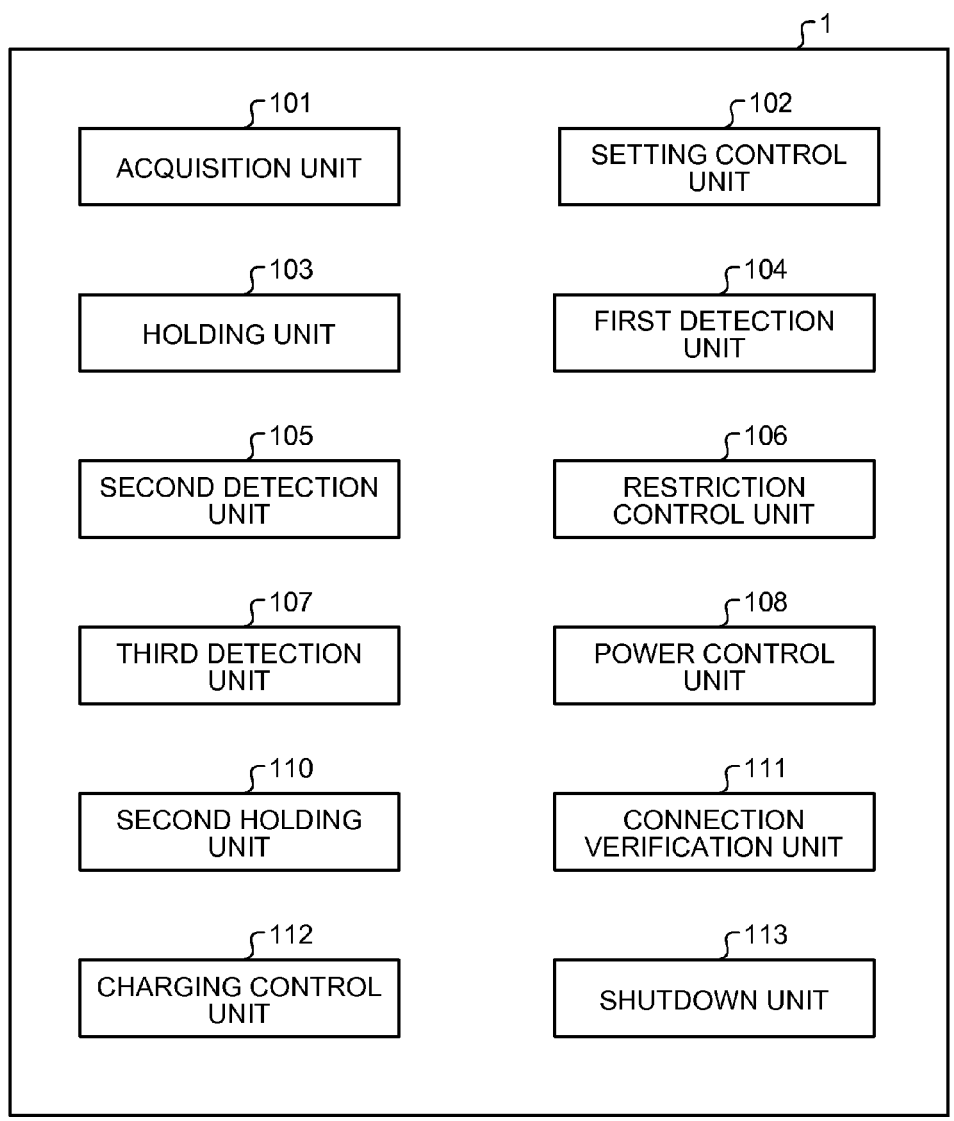
FIG. 10 is diagram illustrating exemplary functions of an MFP of a second embodiment.

FIG. 10 is diagram illustrating exemplary functions of the MFP 1 of the second embodiment. As illustrated in FIG. 10, the MFP 1 further includes a second holding unit 110, a connection verification unit 111, a charging control unit 113, and a shutdown unit 114.

The second holding unit 110 holds one or more pieces of registered image-forming part identification information for identifying one or more predetermined image processing units A. In this embodiment, the registered image-forming part identification information, held in the second holding unit 110, is information for identifying one of the image processing units A that has been communicably connected to the operation part unit B when the first detection unit 104 detects that the state where a function of the image processing unit A is usable via the operation part unit B is established. More specifically, the registered image-forming part identification information is considered to be information for identifying, in the above-described authentication, one of the image processing units A that has been communicably connected with the operation part unit B. Note that the registered image-forming part identification information is not limited to this form, and may take any desirable form. For example, the form thereof may be such that, as the one or more pieces of registered image-forming part identification information, one or more pieces of information for identifying one or more image processing units A predetermined at initial setting are registered in advance on the second holding unit 110.

The connection verification unit 111 verifies whether the operation part unit B is communicably connected with any one of one or more image processing units A identifiable with the one or more pieces of registered image-forming part identification information held in the second holding unit 110, when the following conditions holds at the same time: the operation part unit B has been detached from the image processing unit A; and the amount of power stored in the battery unit 45 (corresponding to a "power storage unit") for storing therein power enabling the operation part unit B to operate on a standalone basis is equal to or smaller than the threshold. More specifically, the connection verification unit 111 verifies whether the operation part unit B is communicably connected to any one of one or more image processing units A identifiable with the one or more pieces of registered image-forming part identification information held in the second holding unit 110, when the following conditions hold at the same time: the operation part unit B has been detached from the image processing unit A in the state where the function of the image processing unit A is usable via the operation part unit B; and the amount of stored power in the battery unit 45 is equal to or smaller than the threshold.

When the connection verification unit 111 has verified that the operation part unit B is communicably connected to any one of the one or more image processing units A identifiable with the one or more pieces of registered image-forming part identification information held in the second holding unit 110, the charging control unit 112 performs charging on the battery unit 45 via the image processing unit A that is communicably connected with the operation part unit B. When the connection verification unit 111 has verified that the operation part unit B is not communicably connected with any one of the image processing units A identifiable with the one or more pieces of registered image-forming part identification information held in the second holding unit 110, the charging control unit 112 does not perform charging on the battery unit 45. Note that, for example, the function of charging control unit 112 may be incorporated into the above-described power control unit 108.

The shutdown unit 113 executes a shutdown process when the operation part unit B has been detached from the image processing unit A in a state where no function of the image processing unit A is usable via the operation part unit B. In this embodiment, the shutdown unit 113 executes a shutdown process when the operation part unit B has been detached from the image processing unit A in a state where the user has not been authenticated. Here, a shutdown process is a process for stopping supply of electricity after discontinuing operation of the system.

Figure 11:
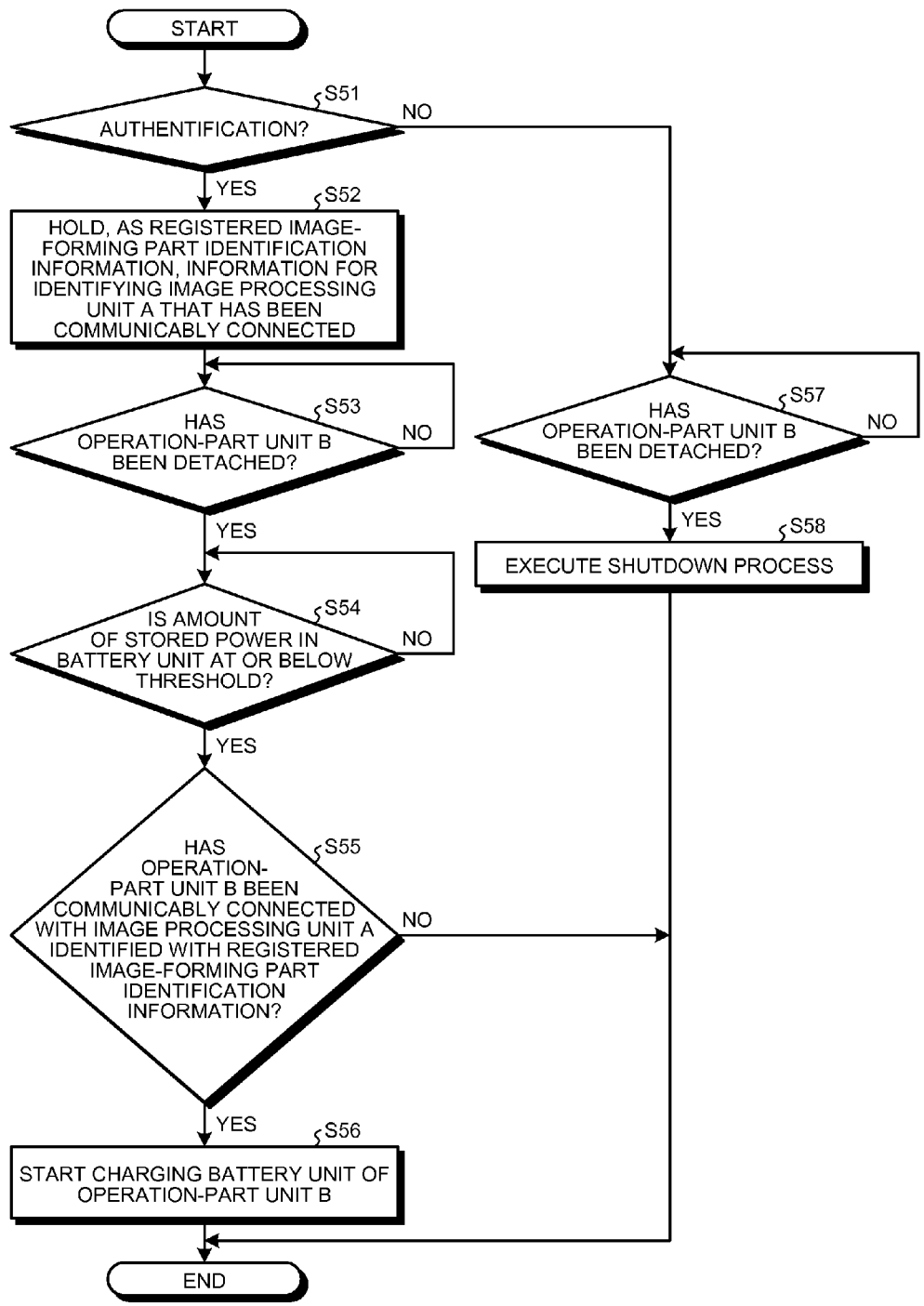
FIG. 11 is a flowchart illustrating exemplary operation of the MFP of the second embodiment.

FIG. 11 is a flowchart illustrating exemplary operation of the MFP 1 of this embodiment. For convenience of description, FIG. 11 illustrates processes that are different from the above-described first embodiment. As described above, a user who have held an IC card 35 over has been authenticated (Yes at step S51), the second holding unit 110 holds information for identifying an image processing unit A that has been communicably connected with the operation part unit B, as one piece of registered image-forming part identification information (step S52). Subsequently, when the operation part unit B has been detached from the image processing unit A (Yes at step S53), the connection verification unit 111 verifies whether the amount of power stored in the battery unit 45 is equal to or smaller than the threshold (step S54). If the amount of power stored in the battery unit 45 is equal to or smaller than the threshold (Yes at step S54), the connection verification unit 111 verifies whether the operation part unit B is communicably connected to an image processing unit A that is identifiable with the registered image-forming part identification information (step S55).

If the result of step S55 described above is affirmative (Yes at step S55), the charging control unit 112 performs charging on the battery unit 45 via the image processing unit A that is communicably connected with the operation part unit B (step S56). If the result of step S55 described above is negative (No at step S55), the charging control unit 112 does not perform charging on the battery unit 45.

When the user has not been authenticated at step S51 (No at step S51) and the operation part unit B has been detached from the image processing unit A (Yes at step S57), the shutdown unit 113 executes a shutdown process (step S58).

As described above, in this embodiment, charging of the battery unit 45 is conditional on communication with the image processing unit A at the time of authentication. Thus, the battery unit 45 cannot be charged without the image processing unit A at the time of authentication even if the operation part unit B is taken away with the IC card 35. This embodiment can exert an effect of encouraging the abandonment of an intention to take away the operation part unit B.

A computer program executed by the MFP 1 of the above-described embodiments may be recorded and provided as an installable or executable file in a computer-readable recording medium such as a compact disc read only memory (CD-ROM), a flexible disk (FD), a compact disc recordable (CD-R), a digital versatile disc (DVD), and a USB flash memory. The computer program may be provided or distributed via a network such as the Internet. Various computer programs may be embedded and provided in a non-volatile recording medium such as a read only memory (ROM).

An embodiment can prevent a highly functional operation part from being stolen.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system including an image forming part, and an operation part attachable to and detachable from the image forming part, the information processing system comprising:
   a first memory storing computer-readable instructions; and
   one or more processors configured to execute the computer-readable instructions to
   detect whether or not performance of at least one function of the image forming part via the operation part is authorized,
   detect whether or not the operation part is detached from the image forming part, and,
   restricting at least one independent function of the operation part by lowering power of the operation part from a first state to a second state, when detecting that the operation part is detached from the image forming part while detecting that the performance of the at least one function of the image forming part, via the operation part, is not authorized.

2. The information processing system of claim 1, wherein the one or more processors are further configured to execute the computer-readable instructions to
   acquire identification information for identifying a user of the operation part; and
   set, when a first condition holds, the power to a state where the at least one function of the image forming part is usable via the operation part, and, when a second condition holds, to set the power to a state where the at least one function of the image forming part is not usable via the operation part, the first condition being that the identification information acquired and previously registered registration information coincide with each other and a user identified with the identification information has been authenticated as having a right to use the at least one function of the image forming part via the operation part, the second condition being that the user has not been authenticated.

3. The information processing system of claim 2, wherein the one or more processors are further configured to execute the computer-readable instructions
- to hold the identification information that has been already authenticated;
- to, upon detecting the operation part has been detached from the image forming part and that the operation part is in the second state where the at least one independent function is possible, when the identification information is acquired, detect whether the acquired identification information coincides with the identification information that has been already authenticated; and
- to cause the operation part to transition into the first state upon detection that the identification information that has been acquired coincides with the identification information that has been already authenticated.

4. The information processing system of claim 1, wherein the one or more processors are further configured to execute the computer-readable instructions
- to hold one or more pieces of registered image-forming part identification information for identifying one or more image forming units, each unit including an image forming part;
- to, when an amount of power stored in a power storage part, configured to store power for the operation part to operate independent of the image forming part, is equal to or smaller than a threshold while the operation part has been detached from the image forming part, verify whether the operation part has been communicably connected with any one of the one or more image forming parts of one or more respective image forming units-identified with the one or more pieces of registered image-forming part identification information; and
- to, upon the verifying that the operation part has been communicably connected with any respective one of the one or more image forming parts of the respective one or more image forming units identified with the one or more pieces of registered image-forming part identification information, perform charging on the power storage part via the communicably connected any respective one of the one or more image forming parts of the respective one or more image forming units.

5. The information processing system of claim 4, wherein, when the operation part is not communicably connected with any of the one or more image forming parts of the respective one or more image forming units that are identified with the held one or more pieces of registered image-forming part identification information, the charging on the power storage part is not performed.

6. The information processing system of claim 4, wherein the registered image-forming part identification information is information for identifying that the respective image forming part is of the respective one or more image forming units communicably connected with the operation part upon detecting that a state where the at least one function of the respective image forming part of the respective one or more image forming units, via the operation part, is authorized.

7. The information processing system of claim 4, wherein, the verification of whether the operation part is communicably connected with any one of the one or more image forming parts of the respective one or more image forming units identified with the one or more pieces of held registered image-forming part identification information, occurs when the operation part is detached from the respective image forming part of the respective one or more image forming units, and when an amount of power stored in the power storage part is equal to or smaller than the threshold where the at least one function of the respective image forming part of the respective one or more image forming units is usable via the operation part.

8. The information processing system claim 4, wherein the one or more processors are further configured to execute the computer-readable instructions to execute a shutdown process when the operation part is detached from the respective image forming part of the respective one or more image forming units in a state where the at least one function of the respective image forming part of the respective one or more image forming units is not usable via the operation part.

9. An information processing method comprising:
- detecting whether or not performance of at least one function of an image forming part via an operation part attachable to and detachable from the image forming part, is authorized;
- detecting whether or not the operation part is detached from the image forming part; and
- restricting at least one independent function of the operation part by lowering power of the operation part from a first state to a second state, when detecting that the operation part is detached from the image forming part while detecting that the performance of the at least one function of the image forming part, via the operation part, is not authorized.

10. A non-transitory computer-readable medium containing an information processing program, the information processing program causing a computer to perform:
- detecting whether or not performance of at least one where a function of an image forming part, via an operation part attachable to and detachable from the image forming part, is authorized;
- detecting whether or not the operation part is detached from the image forming part; and
- restricting at least one independent function of the operation part by lowering power of the operation part from a first state to a second state, when detecting that the operation part is detached from the image forming part while detecting that the performance of the at least one function of the image forming part, via the operation part, is not authorized.

11. The method of claim 9, further comprising:
- acquiring identification information for identifying a user of the operation part; and
- setting, when a first condition holds, the power to a state where the at least one function of the image forming part is usable via the operation part, and, when a second condition holds, setting the power to a state where the at least one function of the image forming part is not usable via the operation part, a first condition being that the identification information acquired and previously registered registration information coincide with each other and a user identified with the identification information has been authenticated as having a right to use the at least one function of the image forming part via the operation part, a second condition being that the user has not been authenticated.

12. The method of claim 11, further comprising:
holding the identification information that has been already authenticated;
detecting, upon detecting the operation part has been detached from the image forming part and that the operation part is in the second state where the at least one independent function is possible, when acquiring the identification information, whether the acquired identification information coincides with the identification information that has been already authenticated; and
causing the operation part to transition into the first state upon detection that the identification information that has been acquired coincides with the identification information that has been already authenticated.

13. The method of claim 9, further comprising:
holding one or more pieces of registered image-forming part identification information for identifying one or more image forming units, each unit including an image forming part;
verifying, when an amount of power stored in a power storage part, configured to store power for the operation part to operate independent of the image forming part, is equal to or smaller than a threshold while the operation part has been detached from the image forming part, whether the operation part has been communicably connected with any one of the one or more image forming parts of one or more respective image forming units identified with the one or more pieces of registered image-forming part identification information; and
performing, upon the verifying that the operation part has been communicably connected with any respective one of the one or more image forming parts of the respective one or more image forming units identified with the one or more pieces of registered image-forming part identification information held, perform charging on the power storage part via the communicably connected any respective one of the one or more image forming parts of the respective one or more image forming units.

14. The method of claim 13, wherein, when the operation part is not communicably connected with any of the one or more image forming parts of the respective one or more image forming units that are identified with the held one or more pieces of registered image-forming part identification information, the charging on the power storage part is not performed.

15. The method of claim 13, wherein the registered image-forming part identification information is information for identifying that the respective image forming part of the respective one or more image forming units is communicably connected with the operation part upon detecting that a state where the at least one function of the respective image forming part of the respective one or more image forming units, via the operation part, is authorized.

16. The information method of claim 13, wherein, the verifying of whether the operation part is communicably connected with any one of the one or more image forming parts of the respective one or more image forming units identified with the one or more pieces of held registered image-forming part identification information, occurs when the operation part is detached from the respective image forming part of the respective one or more image forming units and when an amount of power stored in the power storage part is equal to or smaller than the threshold where the at least one function of the respective image forming part of the respective one or more image forming units is usable via the operation part.

17. The method of claim 13, further comprising: executing a shutdown process when the operation part is detached from the respective image forming part of the respective one or more image forming units in a state where the at least one function of the respective image foing part of the respective one or more image forming units is not usable via the operation part.

* * * * *